(12) United States Patent
Yanagizu et al.

(10) Patent No.: US 10,426,012 B2
(45) Date of Patent: Sep. 24, 2019

(54) LIGHTING CIRCUIT AND VEHICLE LAMP

(71) Applicant: KOITO MANUFACTURING CO., LTD., Tokyo (JP)

(72) Inventors: Shohei Yanagizu, Shizuoka (JP); Masayasu Ito, Shizuoka (JP); Takao Muramatsu, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 114 days.

(21) Appl. No.: 15/678,764

(22) Filed: Aug. 16, 2017

(65) Prior Publication Data

US 2018/0054870 A1   Feb. 22, 2018

(30) Foreign Application Priority Data

Aug. 16, 2016   (JP) .................................. 2016-159700

(51) Int. Cl.
  *H05B 33/08*   (2006.01)
  *B60Q 1/04*    (2006.01)
  *B60Q 11/00*   (2006.01)

(52) U.S. Cl.
  CPC .......... *H05B 33/0884* (2013.01); *B60Q 1/04* (2013.01); *H05B 33/0809* (2013.01); *H05B 33/0821* (2013.01); *H05B 33/0887* (2013.01); *B60Q 11/00* (2013.01); *H05B 33/083* (2013.01)

(58) Field of Classification Search
  CPC .... H05B 33/08; H05B 33/00; H05B 33/0821; H05B 33/0809; H05B 33/0884; B60Q 1/04; B60Q 1/06; B60Q 1/00; F21S 8/10; F21S 48/31; F21S 48/1225; H02H 7/20; G01N 21/47; G01N 21/95

USPC ................... 307/10.8, 10.1, 10.2; 315/77, 81
See application file for complete search history.

(56) References Cited

U.S. PATENT DOCUMENTS

| | | | | |
|---|---|---|---|---|
| 3,631,441 A | * | 12/1971 | Murphy | B60Q 11/005 315/136 |
| 8,330,375 B2 | * | 12/2012 | Matsui | H05B 33/089 315/77 |
| 8,922,051 B2 | * | 12/2014 | Romberger | B60Q 11/005 307/10.8 |
| 9,853,439 B2 | * | 12/2017 | Nakatani | H05B 33/0884 |

(Continued)

FOREIGN PATENT DOCUMENTS

JP   2006103404 A   4/2006

*Primary Examiner* — Fritz M Fleming
*Assistant Examiner* — Jagdeep S Dhillon
(74) *Attorney, Agent, or Firm* — Osha Liang LLP

(57) ABSTRACT

There is provided a lighting circuit configured to drive a light emitting unit including a first light source and a second light source connected in series. The lighting circuit includes a first pin connected to one end of the first light source, a second pin connected to a connection node of the first light source and the second light source, a third pin connected to one end of the second light source, a drive circuit configured to supply a drive current to the light emitting unit, a bypass switch provided between the second pin and the third pin, a first resistor provided in parallel with the bypass switch between the second pin and the third pin, and an abnormality detection circuit configured to detect abnormality based on a detection voltage generated between the second pin and the third pin when an ON signal is applied to the bypass switch.

12 Claims, 5 Drawing Sheets

(56) References Cited

U.S. PATENT DOCUMENTS

2009/0200963 A1* 8/2009 Kitagawa ............. H05B 33/089
                                                                315/297
2015/0158414 A1* 6/2015 Ohta ........................ B60Q 1/00
                                                                315/77

* cited by examiner

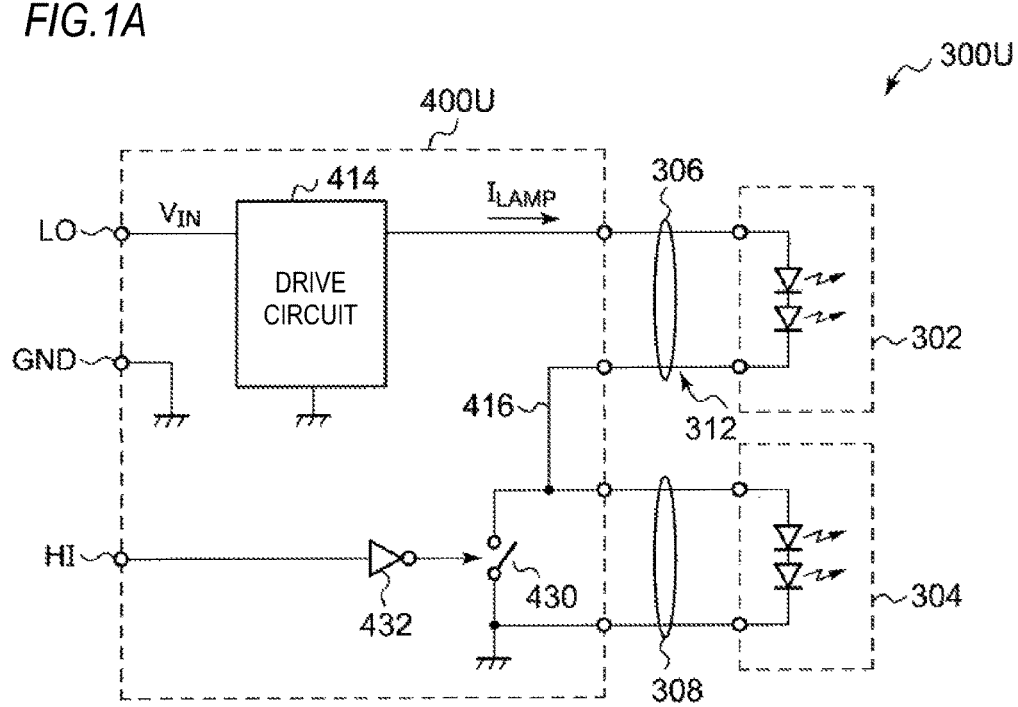
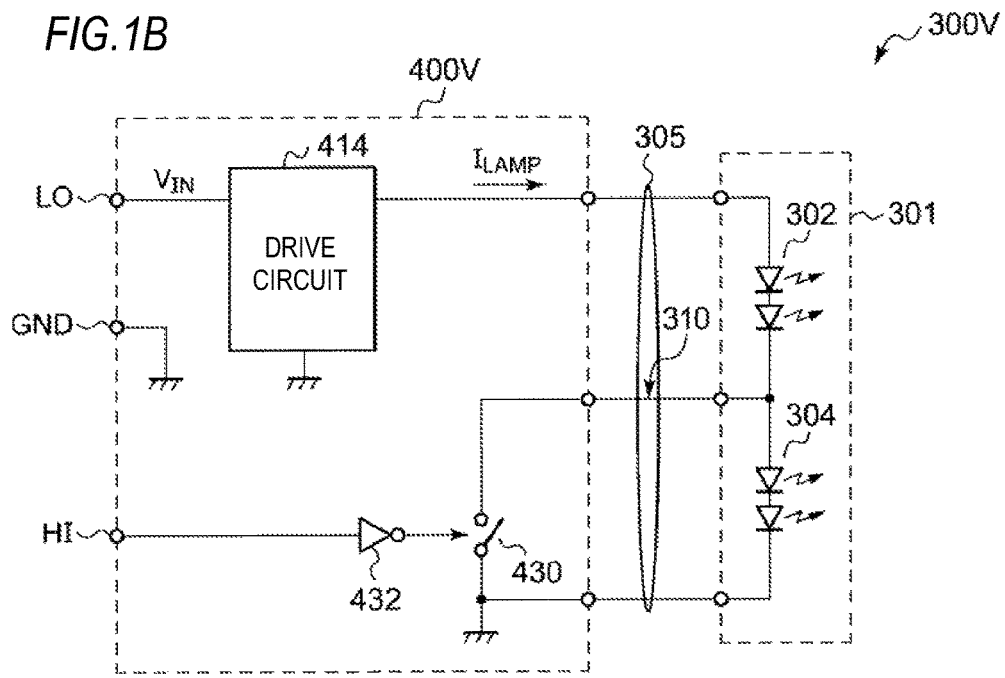

LIGHTING CIRCUIT AND VEHICLE LAMP

CROSS-REFERENCE TO RELATED APPLICATIONS

The present application claims the benefit of priority of Japanese Patent Application No. 2016-159700, filed on Aug. 16, 2016, the content of which is incorporated herein by reference.

TECHNICAL FIELD

The present invention relates to a lamp for an automobile or the like.

BACKGROUND

Halogen lamps and High Intensity Discharge (HID) lamps are conventional mainstream of light sources for vehicle lamps, particularly, for headlamps. In recent years, vehicle lamps are developed to use semiconductor light sources, such as Light Emitting Diodes (LEDs) and Laser Diodes (LDs), instead of these halogen lamps and HID lamps (for example, JP-A-2006-103404).

A vehicle lamp includes a plurality of light sources which are configured to be lit on and off individually. For example, a vehicle lamp includes a low beam light source and a high beam light source. FIGS. 1A and 1B are circuit diagrams of a vehicle lamp including a plurality of light sources which are investigated by the inventors. In FIGS. 1A and 1B, a first light source 302 is for low beam and a second light source 304 is for high beam.

In FIG. 1A, the first light source 302 and the second light source 304 of a vehicle lamp 300U are configured as individual light emitting units and are respectively connected to a lighting circuit 400U via wire harnesses 306, 308. The first light source 302, the second light source 304, the wire harnesses 306, 308, and a wire 416 in the lighting circuit 400U form a series current path.

The lighting circuit 400U includes a drive circuit 414, a bypass switch 430, and a switch driver 432. The drive circuit 414 is configured by combining (i) a constant current converter or (ii) a constant voltage converter, with a constant current circuit.

When a power-supply voltage $V_{IN}$ is supplied to an LO terminal, the drive circuit 414 supplies a drive current $I_{LAMP}$ (lamp current) to a current path including the first light source 302 and the second light source 304.

The bypass switch 430 is provided in parallel with the second light source 304, and the switch driver 432 turns off the bypass switch 430 when an HI terminal is at a high level. In this case, the drive current $I_{LAMP}$ is supplied to the second light source 304 such that the second light source 304 is lit on. The switch driver 432 turns on the bypass switch 430 when the HI terminal is at a low level. In this case, the drive current $I_{LAMP}$ flows through the bypass switch 430 and the second light source 304 is lit off.

In FIG. 1B, a first light source 302 and a second light source 304 of a vehicle lamp 300V are configured as a single light emitting unit 301 which is connected to a lighting circuit 400V via a wire harness 305. In FIG. 1A, the wire harnesses 306, 308 respectively include two wires, i.e. four wires in total. In FIG. 1B, the wire harness 305 includes three wires, so that the wires, terminals (pins), and the wire 416 in FIG. 1A can be reduced.

The inventors have recognized the following problems after investigating the lighting circuit 400V of FIG. 1B. Due to poor connection of terminals, wire disconnection or the like, open abnormality may occur in the wire harness 305. Now, it is assumed that open abnormality occurs in a center wire 310 of the wire harness 305.

When open abnormality occurs in the wire 310, the drive current $I_{LAMP}$ flows through the first light source 302 and the second light source 304, and the second light source 304 cannot be turned off, regardless of ON or OFF of the bypass switch 430. It is noted that when open abnormality occurs in the wire 312, problems like those in FIG. 1B would not occur in the vehicle lamp 300U of FIG. 1A since the second light source 304 is turned off When open abnormality occurs in the bypass switch 430, the second light source 304 cannot be turned off either.

Although the combination of the high beam and the low beam has been described here, the same problem may also occur in combination of other light sources.

SUMMARY

The present invention has been made in view of the above circumstances, and an aspect of the present invention provides a lighting circuit capable of detecting open abnormality.

According to an aspect of the present invention, there is provided a lighting circuit which is configured to drive a light emitting unit including a first light source and a second light source connected in series. The lighting circuit includes a first pin which is connected to one end of the first light source, a second pin which is connected to a connection node of the first light source and the second light source, a third pin which is connected to one end of the second light source, a drive circuit which is configured to supply a drive current to the light emitting unit, a bypass switch which is provided between the second pin and the third pin, a first resistor which is provided in parallel with the bypass switch between the second pin and the third pin, and an abnormality detection circuit which is configured to detect abnormality based on a detection voltage generated between the second pin and the third pin when an ON signal is applied to the bypass switch.

According to the above configuration, at least one of open abnormality of the wire harness and open abnormality of the bypass switch can be detected.

The abnormality detection circuit may be configured to determine that abnormality occurs when the ON signal is applied to the bypass switch and the detection voltage is smaller than a first threshold which is set near zero.

When open abnormality occurs in the wire (or terminal) in the wire harness connecting the light emitting unit to the second pin, the drive current flows through the second light source. Since the drive current does not flow through the bypass switch or the first resistor, the detection voltage between the second pin and the third pin is near zero. Therefore, open abnormality in the wire connecting the light emitting unit to the second pin can be detected.

The abnormality detection circuit may be configured to determine that abnormality occurs when the ON signal is applied to the bypass switch and the detection voltage is within a voltage range which is based on a forward voltage when the drive current flows through the second light source.

When the wire (or terminal) in the wire harness connecting the light emitting unit to the second pin is normal and open abnormality occurs in the bypass switch, the drive current flows through the second light source, and a forward voltage is generated between the second pin and the third pin. Therefore, open abnormality of the bypass switch can be detected.

The abnormality detection circuit may determine that abnormality occurs when the ON signal is applied to the bypass switch and the detection voltage is smaller than the first threshold or greater than a second threshold.

Therefore, open abnormality of the wire harness and the bypass switch can be detected.

The lighting circuit may further include a second resistor which is provided in series with the bypass switch between the second pin and the third pin. When the drive current is $I_{LAMP}$, a resistance value of the second resistor is $R_2$, and on-resistance of the bypass switch is $R_{ON}$, and the wire harness and the bypass switch are normal, the detection voltage $V_{DET}$ between the second pin and the third pin is represented by the following Equation (2).

$$V_{DET}=I_{LAMP} \times (R_2+R_{ON}) \quad (2)$$

That is, since a normal range of the detection voltage can be shifted by taking $R_2$ as a parameter, it is easy to set thresholds for abnormality determination.

The third pin may be grounded. Therefore, it is easy to compare the detection voltage with the thresholds. In addition, control of the bypass switch can be simplified.

According to another aspect of the present invention, there is provided a vehicle lamp. The vehicle lamp may include a light emitting unit which includes a first light source and a second light source connected in series, the above lighting circuit which is configured to drive the light emitting unit, and a wire harness which includes three wires connecting the light emitting unit to the lighting circuit.

Any combination of the above constituent elements, and the constituent elements and expressions of the present invention mutually replaced by methods, apparatuses, systems, and the like are also within the scope of the present invention.

According to the above configuration, abnormality can be detected.

BRIEF DESCRIPTION OF THE DRAWINGS

The above and other aspects of the present invention will become more apparent and more readily appreciated from the following description of illustrative embodiments of the present invention taken in conjunction with the attached drawings, in which:

FIGS. 1A and 1B are circuit diagrams of vehicle lamps including a plurality of light sources which are investigated by the inventors;

DETAILED DESCRIPTION

Figure 2:
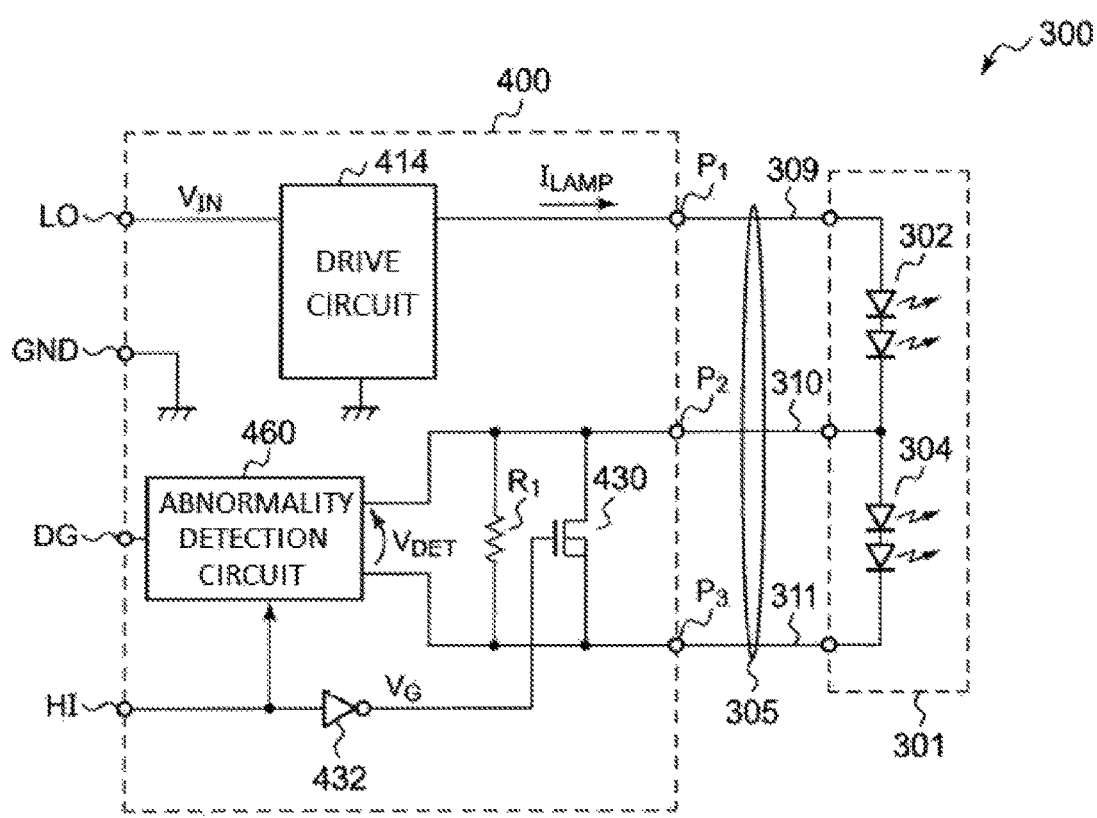
FIG. 2 is a block diagram of a vehicle lamp including a lighting circuit according to an embodiment.

Embodiments of the present invention will be described with reference to the drawings. Identical or equivalent components, members, and processes shown in each drawing are given with same reference numerals, and repeated descriptions are omitted appropriately. The embodiments are not intended to limit the scope of the present invention but are merely illustrative, and all features described in the embodiment and combinations thereof are not essential to the present invention.

In the specification, "a state where a member A is connected to a member B" includes not only a case where the member A and the member B are connected physically and directly, but also a case where the member A and the member B are connected indirectly via other members which do not cause substantial effects on an electrical connection state thereof or do not impair functions or effects due to the connection thereof.

Similarly, "a state where a member C is provided between a member A and a member B" includes not only a case where the member A and the member C, or the member B and the member C, are connected directly, but also a case where the member A and the member C, or the member B and the member C, are connected indirectly via other members which do not cause substantial effects on an electrical connection state thereof or do not impair functions or effects due to the connection thereof.

In the specification, reference numerals given to electrical signals such as voltage signals and current signals, or circuit elements such as resistors and capacitors may represent voltage values and current values, or resistance values and capacitance.

FIG. 2 is a block diagram of a vehicle lamp 300 including a lighting circuit 400 according to an embodiment. The vehicle lamp 300 includes a light emitting unit 301, a wire harness 305, and the lighting circuit 400. The light emitting unit 301 may contain a first light source 302 and a second light source 304 connected in series, and may be mounted on one substrate or configured as one module, but is not limited thereto. For example, the first light source 302 may be a low beam light source and the second light source 304 may be a high beam light source.

The wire harness 305 is detachably connected to the light emitting unit 301 and the lighting circuit 400. The wire harness 305 includes three wires 309, 310, 311. The first wire 309 connects a first pin $P_1$ of the lighting circuit 400 to an anode of the first light source 302, the second wire 310 connects a second pin $P_2$ of the lighting circuit 400 to a cathode of the first light source 302 and an anode of the second light source 304, the third wire 311 connects a third pin $P_3$ of the lighting circuit 400 to a cathode of the second light source 304. The third pin $P_3$ is grounded in this embodiment.

The lighting circuit 400 includes the first pin $P_1$ to the third pin $P_3$, a drive circuit 414, a bypass switch 430, a switch driver 432, a first resistor $R_1$, and an abnormality detection circuit 460. The lighting circuit 400 drives the light emitting unit 301. Specifically, the lighting circuit 400 can be switched between a first mode in which a drive current $I_{LAMP}$ is supplied to the first light source 302 only such that a low beam is lit on and a second mode in which the drive current $I_{LAMP}$ is supplied to the first light source 302 and the second light source 304 such that both low and high beams are lit on.

The lighting circuit 400 further includes a ground (GND) pin, an LO pin, and an HI pin, but is not limited thereto. In this embodiment, when a power-supply voltage $V_{IN}$ is supplied to the LO pin and the HI pin is at a low level, the lighting circuit 400 is switched to the first mode. When the power-supply voltage $V_{IN}$ is supplied to the LO pin and the HI pin is at high level, the lighting circuit 400 is switched to the second mode.

The drive circuit 414 supplies the drive current $I_{LAMP}$ to the light emitting unit 301. The drive circuit 414 may be configured by combining (i) a constant current output converter or (ii) a constant voltage output converter, with a constant current circuit. The circuit type of the converter is not limited, and a buck type, a boost type, a boost-buck type and the like may be used. Particularly, the drive circuit 414 may be configured by a Buck converter, a Boost converter, a Cuk converter, a Flyback converter or the like. The control method of the converter is also not limited, and a control method using an error amplifier, or a hysteresis control (Bang-Bang control) method may be used.

The bypass switch 430 and the second light source 304 are provided in parallel between the second pin $P_2$ and the third pin $P_3$. For example, the bypass switch 430 can be configured by an N-Channel Metal Oxide Semiconductor Field Effect Transistor (MOSFET).

When a low level is input to the HI pin of the lighting circuit 400, the switch driver 432 applies a gate signal $V_G$ at a high level to a gate of the bypass switch 430 and turns on the bypass switch 430. When a high level is input to the LO pin of the lighting circuit 400, the switch driver 432 applies the gate signal $V_G$ at a low level to the gate of the bypass switch 430 and turns off the bypass switch 430.

The first resistor $R_1$ and the abnormality detection circuit 460 are provided in connection with abnormality detection. The first resistor $R_1$, the bypass switch 430, and the second light source 304 are provided in parallel between the second pin $P_2$ and the third pin $P_3$. A resistance value of the first resistor $R_1$ is sufficiently higher than on-resistance $R_{ON}$ of the bypass switch 430 and impedance ($V_F/I$) of the second light source 304 such that no current flows through the first resistor $R_1$. For example, the resistance value of $R_1$ is several kΩ.

The abnormality detection circuit 460 detects abnormality according to a detection voltage $V_{DET}$ generated between the second pin $P_2$ and the third pin $P_3$ when an ON signal (the gate signal at a high level) is applied to the bypass switch 430, i.e. in the second mode. Accordingly, information representing ON or OFF of the bypass switch 430, particularly, a signal of the HI pin or the gate signal $V_G$ of the bypass switch 430, is input to the abnormality detection circuit 460.

The abnormality detection circuit 460 asserts a diagnostic (DG) signal (for example, makes it to a high level) when abnormality is detected. The DG signal is supplied to a processor (microcomputer) of a vehicle Electronic Control Unit (ECU; not shown) or a processor of a lamp ECU (not shown).

The abnormality detection circuit 460 can detect open abnormality of the wire 310 in the wire harness 305 and open abnormality of the bypass switch 430. The detection methods will be explained as following.

(Normal State)

Figure 3A:
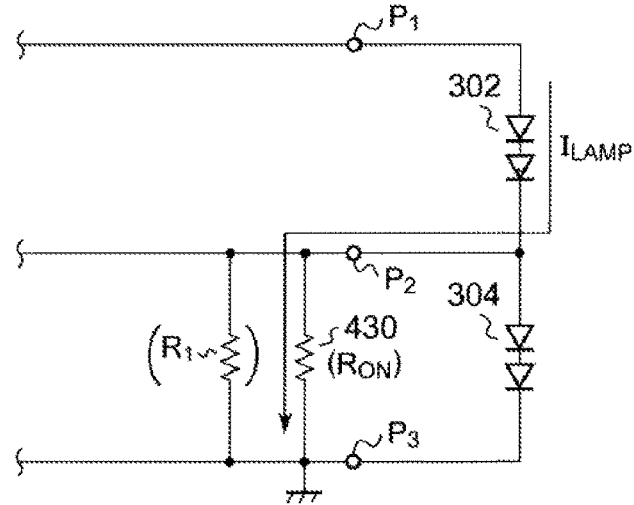
FIGS. 3A to 3C are equivalent circuit diagrams of a vehicle lamp.

FIG. 3A is an equivalent circuit diagram of the vehicle lamp 300 in a normal state. The drive current $I_{LAMP}$ flows through a path including the first pin $P_1$, the first light source 302, the second pin $P_2$, and the bypass switch 430 when the wire 310 is normal and the bypass switch 430 is normally turned on. Since $R_{ON} \ll R_1$, the first resistor $R_1$ can be ignored and the detection voltage $V_{DET}$ (a normal value $V_{NORM}$) between the second pin $P_2$ and the third pin $P_3$ is represented by Equation (1).

$$V_{NORM} = I_{LAMP} \times R_{ON} \quad (1)$$

Therefore, the abnormality detection circuit 460 can determine that the vehicle lamp 300 is normal when the detection voltage $V_{DET}$ is within a normal range including the normal value $V_{NORM}$ of Equation (1), otherwise the vehicle lamp 300 is abnormal. Abnormality includes two modes described below.

(Open Abnormality of Wire Harness)

Figure 3B:
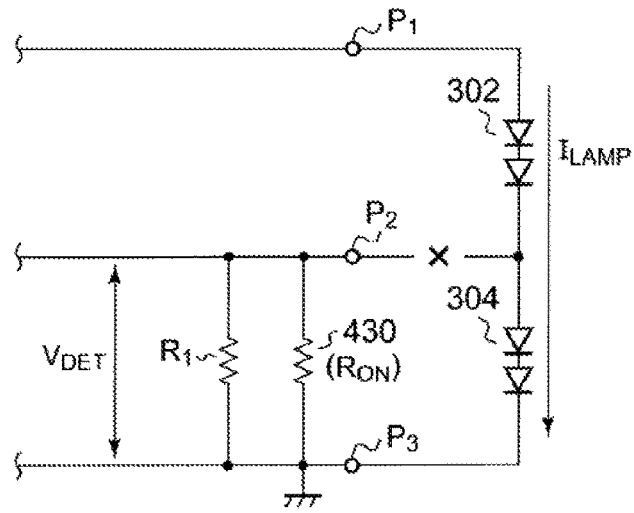

FIG. 3B is an equivalent circuit diagram with the wire harness 305 in an open abnormality state. The drive current $I_{LAMP}$ flows through a path including the first pin $P_1$, the first light source 302, the second light source 304, and the third pin $P_3$ when open abnormality occurs in the wire 310. Since the current does not flow through the bypass switch 430 and the first resistor $R_1$, the detection voltage $V_{DET}$ is zero. Therefore, the abnormality detection circuit 460 can determine that open abnormality occurs in the wire harness when the detection voltage $V_{DET}$ is smaller than the first threshold $V_{TH1}$ which is set near zero. The first threshold $V_{TH1}$ corresponds to a lower limit of the normal range of the detection voltage $V_{DET}$, and can be set between 0 V and the normal value $V_{NORM}$ of Equation (1).

(Open Abnormality of Bypass Switch)

Figure 3C:
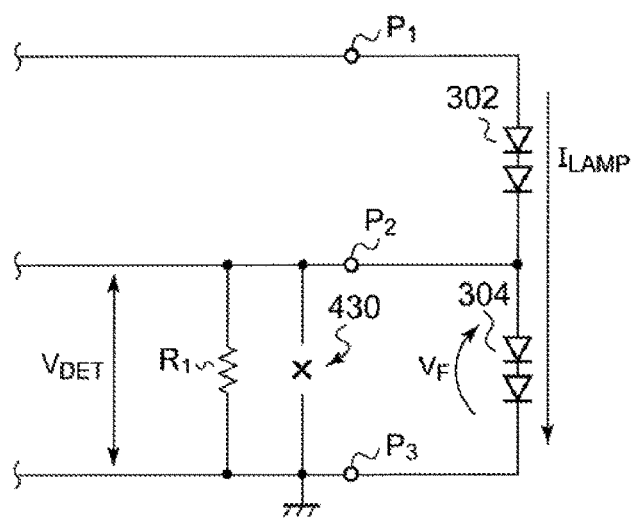

FIG. 3C is an equivalent circuit diagram with the bypass switch 430 in an open abnormality state. Similar to FIG. 3B, the drive current $I_{LAMP}$ flows through a path including the first pin $P_1$, the first light source 302, the second light source 304, and the third pin $P_3$ when open abnormality occurs in the bypass switch 430. At this time, a potential of the second pin $P_2$ is equal to a cathode voltage of the second light source 304, and a potential of the third pin $P_3$ is equal to an anode voltage of the second light source 304, so that the detection voltage $V_{DET}$ is equal to a forward voltage $V_F$ of the second light source 304.

Therefore, the abnormality detection circuit 460 determines that abnormality occurs when the detection voltage $V_{DET}$ is within a voltage range based on the forward voltage $V_F$. The boundary (a second threshold $V_{TH2}$) between the voltage range and an allowable voltage range can be set between the forward voltage $V_F$ and the normal value $V_{NORM}$ of Equation (1).

Figure 4:
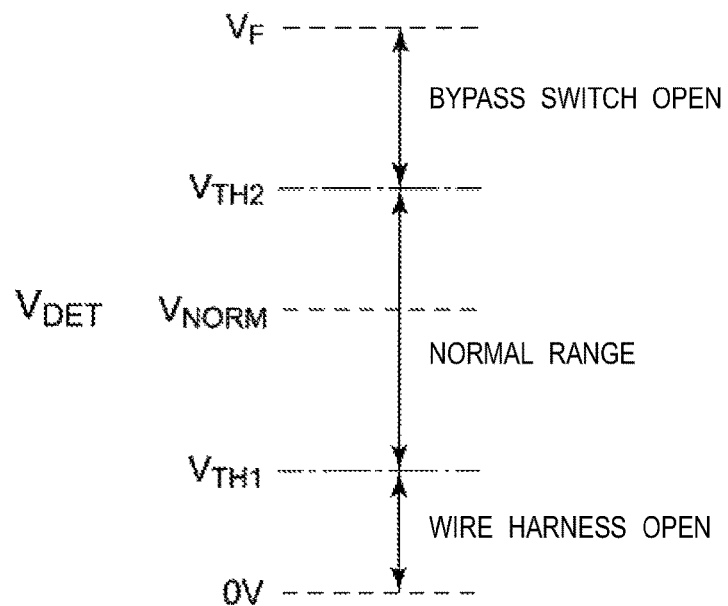
FIG. 4 is a level diagram of a detection voltage $V_{DET}$.

FIG. 4 is a level diagram of the detection voltage $V_{DET}$. The abnormality detection circuit 460 has two thresholds $V_{TH1}$, $V_{TH2}$. The first threshold $V_{TH1}$ is set between the normal value $V_{NORM}$ and 0 V, and the second threshold $V_{TH2}$ is set between the normal value $V_{NORM}$ and the forward voltage $V_F$ of the second light source 304. The abnormality detection circuit 460 may determine that the bypass switch is normal and negate the DG signal when $V_{TH1} < V_{DET} < V_{TH2}$, and may determine abnormality occurs and assert the DG signal when $V_{DET} < V_{TH1}$ or $V_{TH2} < V_{DET}$.

Since on-resistance $R_{ON}$ of the bypass switch 430, the drive current $I_{LAMP}$, and the forward voltage $V_F$ have variations, the thresholds $V_{TH1}$, $V_{TH2}$ may be set taking the variations into account.

When the drive current $I_{LAMP}$ is changed for controlling luminance of the light sources, the normal value $V_{NORM}$ takes a value in a range. In this case, the first threshold $V_{TH1}$ is set between a lower limit of the range and 0 V, and the second threshold $V_{TH2}$ is set between an upper limit of the range and $V_F$.

There have been described configurations and operations of the vehicle lamp 300. According to the vehicle lamp 300 of the embodiment, open abnormality of the wire harness 305, in other words, abnormality that the second light source 304 cannot be turned off, can be detected. Further, according to the vehicle lamp 300, open abnormality of the bypass switch 430 can be detected.

For example, the vehicle may store abnormality occurrence in logs, and/or inform a driver of the abnormality occurrence when the DG signal is asserted. Whether to light off the first light source 302 and the second light source 304 or to keep them lit on in response to the assertion of the DG signal is decided based on safety-related policies of vehicle manufacturers and/or regions or countries.

Since the third pin $P_3$ is grounded, the lighting circuit 400 in FIG. 2 can process the detection voltage $V_{DET}$ taking a ground voltage as a reference and the configuration of the circuit can be simplified.

Figure 5:
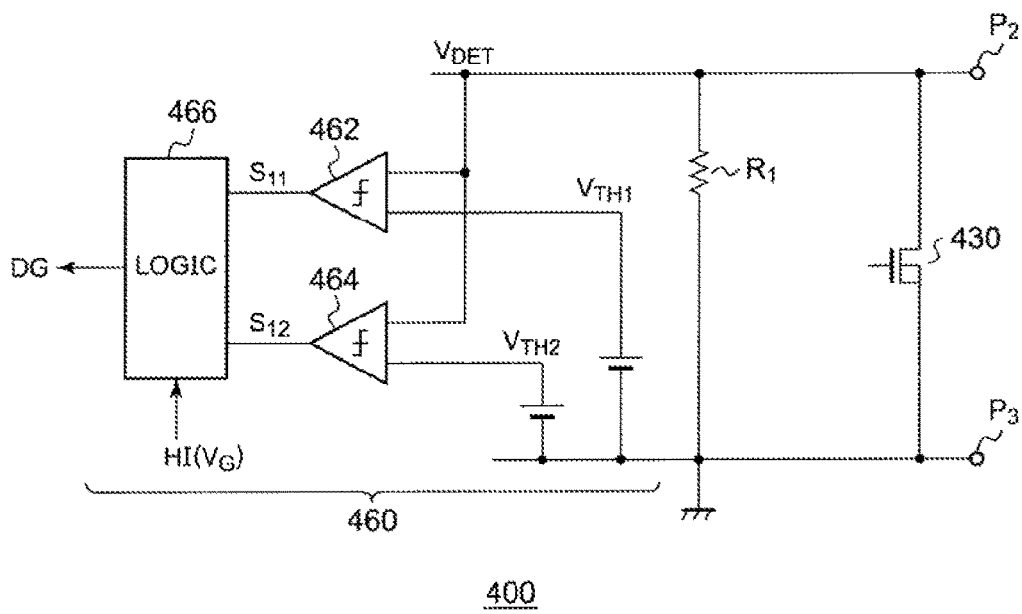
FIG. 5 is a diagram showing a configuration example of an abnormality detection circuit.

FIG. 5 is a diagram showing a configuration example of the abnormality detection circuit 460. The abnormality detection circuit 460 includes voltage comparators 462, 464 and a logic circuit 466. The voltage comparator 462 compares the detection voltage $V_{DET}$ with the first threshold $V_{TH1}$ and generates a determination signal $S_{11}$ representing a comparison result. The voltage comparator 464 compares the detection voltage $V_{DET}$ with the second threshold $V_{TH2}$ and generates a determination signal $S_{12}$ representing a comparison result. The logic circuit 466 asserts the DG signal when the HI pin (or the gate signal $V_G$) is in the second mode and at least one of the two determination signals $S_{11}$, $S_{12}$ is at a level corresponding to abnormality.

The abnormality detection circuit 460 may be configured by combining discrete elements or may also be integrated into a controller IC for controlling a converter of the drive circuit 414. Alternatively, a part of the abnormality detection circuit 460 (for example, processing of the logic circuit 466) may be mounted in the lamp ECU (processor).

Although the present invention has been described with the specific embodiment, the embodiment merely shows the principle and application of the present invention. Various modifications and configuration changes may be made in the embodiment without departing from the inventive concept as defined in the claims.

(First Modification)

Figure 6:
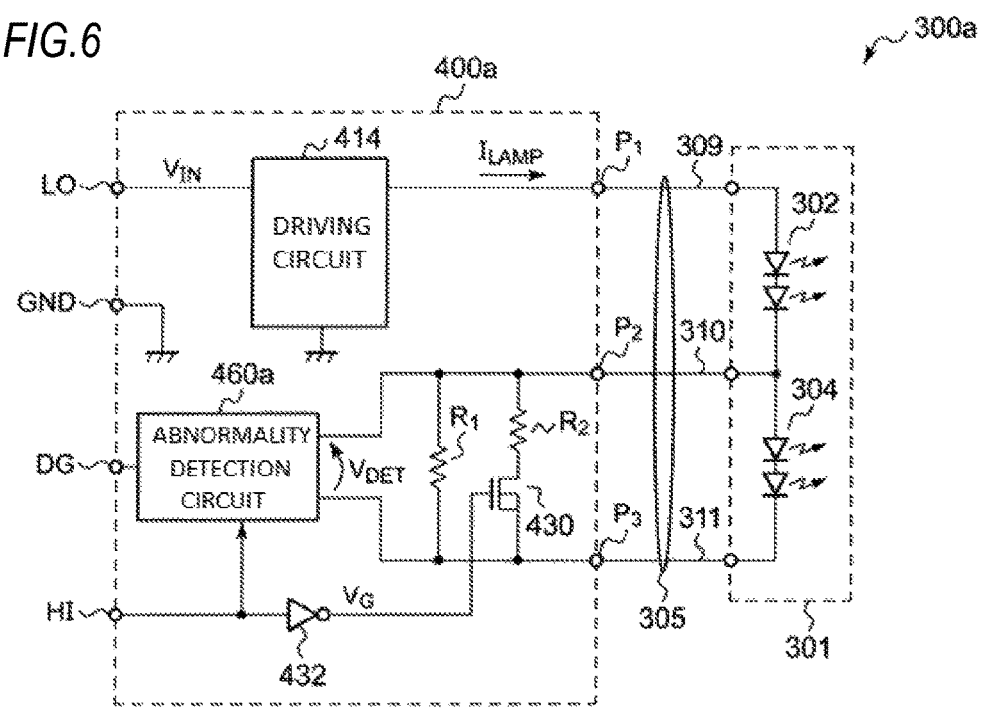
FIG. 6 is a circuit diagram of a lighting circuit according to a first modification.

FIG. 6 is a circuit diagram of a lighting circuit 400a according to a first modification. The lighting circuit 400a includes a second resistor $R_2$ in addition to the lighting circuit 400 of FIG. 2. The second resistor $R_2$ and the bypass switch 430 are provided in series between the second pin $P_2$ and the third pin $P_3$.

A detection voltage $V_{DET}$ in a normal state (normal value $V_{NORM}'$) is represented by Equation (2).

$$V_{NORM}' = I_{LAMP} \times (R_{ON} + R_2) \quad (2)$$

Therefore, an abnormality detection circuit 460a determines that the vehicle lamp 300 is normal when the detection voltage $V_{DET}$ is within a normal range including the normal value $V_{NORM}'$ of Equation (2), otherwise the vehicle lamp 300 is abnormal.

According to this modification, since the normal value $V_{NORM}'$ of the detection voltage $V_{DET}$ may be shifted by taking resistance value of the second resistor $R_2$ as a parameter, it is easy to set thresholds for abnormality determination, and detection accuracy may be improved.

(Second Modification)

Figure 7:
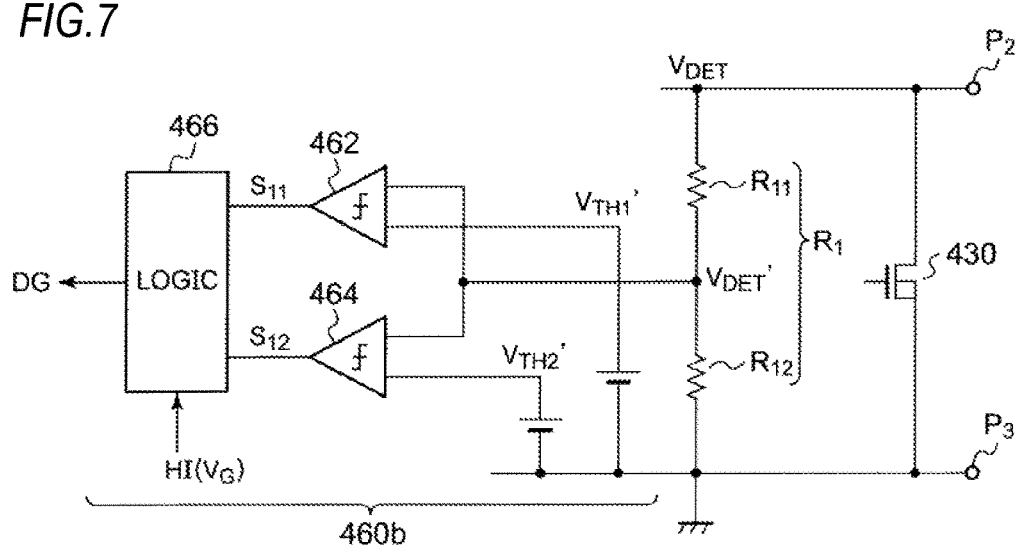
FIG. 7 is a circuit diagram showing a part of a lighting circuit according to a second modification.

FIG. 7 is a circuit diagram showing a part of a lighting circuit 400b according to a second modification. A first resistor $R_1$ includes resistors $R_{11}$, $R_{12}$ connected in series. A detection voltage $V_{DET}'$ is obtained by dividing the detection voltage $V_{DET}$ with the resistor $R_{11}$ and the resistor $R_{12}$ and is generated at a connection node of the two resistors $R_{11}$, $R_{12}$. An abnormality detection circuit 460b determines abnormality based on the divided detection voltage $V_{DET}'$.

When a forward voltage $V_F$ is 5V, the maximum of the detection voltage $V_{DET}$ is also 5V, the voltage $V_{DET}'$ is generated by dividing the detection voltage $V_{DET}$, therefore the abnormality detection circuit 460b may be configured by a 5 V system or 3.5 V system.

(Third Modification)

The abnormality detection circuit 460 may be mainly configured by a digital circuit. In this case, the detection voltage $V_{DET}$ may be converted to a digital signal $D_{DET}$ by an A/D converter, and the digital signal $D_{DET}$ may be compared with a digital threshold corresponding to the two thresholds $V_{TH1}$, $V_{TH2}$ by digital signal processing. In this case, the function of the abnormality detection circuit 460 may be executed by the processor of the lamp ECU. Specifically, as shown in FIG. 7, the function of the abnormality detection circuit 460 may be easily incorporated into a microcomputer with 5 V or 3 V power supply by utilizing the divided detection voltage $V_{DET}'$.

(Fourth Modification)

The abnormality detection circuit 460 may detect only open abnormality of the wire 310 of the wire harness 305. In this case, the abnormality detection circuit 460 may determine that abnormality occurs when the detection voltage $V_{DET}$ is smaller than the first threshold $V_{TH1}$. On the contrary, the abnormality detection circuit 460 may detect only open abnormality of the bypass switch 430. In this case, the abnormality detection circuit 460 may determine that abnormality occurs when the detection voltage $V_{DET}$ is greater than the second threshold $V_{TH2}$.

(Fifth Modification)

The abnormality detection circuit 460 may generate a DG signal such that open abnormality of the wire harness 305 may be distinguished from open abnormality of the bypass switch 305. For example, the DG signal may be set as a multi-value signal, or transmitted through two lines.

(Other Modifications)

The first light source 302 may be provided on a low potential side and the second light source 304 may be provided on a high potential side. Alternatively, a negative voltage output converter may be used in the drive circuit 414.

The light sources 302, 304 are not limited to LED and may be LD or organic Electro Luminescence (EL). Further, the drive circuit 414 is not limited to a switching converter and may be configured by a linear regulator or other circuits. Although two light sources 302, 304 are connected in series in the embodiment, three or more light sources may be connected in series.

The first light source 302 and the second light source 304 may be a combination different from the combination of a low beam and a high beam. For example, the first light source 302 may be a normal low beam, and the second light source 304 may be an additional low beam.

What is claimed is:

1. A lighting circuit which is configured to drive a light emitting unit including a first light source and a second light source connected in series, the lighting circuit comprising:
    a first pin which is connected to one end of the first light source;
    a second pin which is connected to a connection node of the first light source and the second light source;
    a third pin which is connected to one end of the second light source;
    a drive circuit which is configured to supply a drive current to the light emitting unit;
    a bypass switch which is provided between the second pin and the third pin;

a first resistor which is provided in parallel with the bypass switch between the second pin and the third pin; and an abnormality detection circuit which is configured to detect abnormality based on a detection voltage generated between the second pin and the third pin when an ON signal is applied to the bypass switch, wherein the abnormality detection circuit is configured to determine that abnormality occurs if the detection voltage is smaller than a first threshold or greater than a second threshold when the ON signal is applied to the bypass switch, the second threshold is larger than the first threshold.

2. The lighting circuit according to claim 1, wherein the abnormality detection circuit is configured to determine that abnormality occurs when the ON signal is applied to the bypass switch and the detection voltage is smaller than a first threshold which is set near zero.

3. The lighting circuit according to claim 1, wherein the abnormality detection circuit is configured to determine that abnormality occurs when the ON signal is applied to the bypass switch and the detection voltage is within a voltage range which is based on a forward voltage when the drive current flows through the second light source.

4. The lighting circuit according to claim 1, wherein a second resistor is provided in series with the bypass switch between the second pin and the third pin.

5. The lighting circuit according to claim 1, wherein the third pin is grounded.

6. A vehicle lamp comprising:

a light emitting unit which includes a first light source and a second light source connected in series;

a lighting circuit according to claim 1 which is configured to drive the light emitting unit; and a wire harness which includes three wires connecting the light emitting unit to the lighting circuit.

7. A lighting circuit which is configured to drive a light emitting unit including a first light source and a second light source connected in series, the lighting circuit comprising:

a first pin which is connected to one end of the first light source;

a second pin which is connected to a connection node of the first light source and the second light source;

a third pin which is connected to one end of the second light source;

a drive circuit which is configured to supply a drive current to the light emitting unit;

a bypass switch which is provided between the second pin and the third pin;

a first resistor which is provided in parallel with the bypass switch between the second pin and the third pin; and an abnormality detection circuit which is configured to detect abnormality based on a detection voltage generated between the second pin and the third pin when an ON signal is applied to the bypass switch, wherein the abnormality detection circuit is configured to determine that abnormality occurs if the detection voltage is smaller than a first threshold or greater than a second threshold when the ON signal is applied to the bypass switch, the second threshold is larger than the first threshold, wherein the abnormality detection circuit comprises at least two voltage comparators and a logic circuit, and wherein the logic circuit asserts a diagnostic signal on detecting abnormality.

8. The lighting circuit according to claim 7, wherein the abnormality detection circuit is configured to determine that abnormality occurs when the ON signal is applied to the bypass switch and the detection voltage is smaller than a first threshold which is set near zero.

9. The lighting circuit according to claim 7, wherein the abnormality detection circuit is configured to determine that abnormality occurs when the ON signal is applied to the bypass switch and the detection voltage is within a voltage range which is based on a forward voltage when the drive current flows through the second light source.

10. The lighting circuit according to claim 7, wherein a second resistor is provided in series with the bypass switch between the second pin and the third pin.

11. The lighting circuit according to claim 7, wherein the third pin is grounded.

12. A vehicle lamp comprising:

a light emitting unit which includes a first light source and a second light source connected in series;

a lighting circuit according to claim 7 which is configured to drive the light emitting unit; and a wire harness which includes three wires connecting the light emitting unit to the lighting circuit.

* * * * *